United States Patent
Loerner (10) Patent No.: US 12,445,217 B2
(45) Date of Patent: Oct. 14, 2025

(54) MEASUREMENT DEVICE AND METHOD FOR OPERATING A MEASUREMENT DEVICE

(71) Applicant: Rohde & Schwarz GmbH & Co. KG, Munich (DE)

(72) Inventor: Markus Loerner, Arget/Sauerlach (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 214 days.

(21) Appl. No.: 18/365,124

(22) Filed: Aug. 3, 2023

(65) Prior Publication Data

US 2024/0080118 A1    Mar. 7, 2024

(30) Foreign Application Priority Data

Sep. 6, 2022   (EP) ..................... 22194027

(51) Int. Cl.
*H04B 17/373*    (2015.01)
*H03M 1/00*      (2006.01)
(Continued)

(52) U.S. Cl.
CPC .......... *H04B 17/373* (2015.01); *H03M 1/001* (2013.01); *H04B 1/006* (2013.01);
(Continued)

(58) Field of Classification Search
CPC .... H04B 17/373; H04B 1/006; H04B 17/101; H04B 17/201; H04B 17/15; H04B 17/29;
(Continued)

(56) References Cited

U.S. PATENT DOCUMENTS

| 9,557,358 B2 | 1/2017 | Ward |
| 2006/0161369 A1 | 7/2006 | Wong et al. |

(Continued)

FOREIGN PATENT DOCUMENTS

| CN | 109324248 A | 2/2019 |
| CN | 209247903 U | 8/2019 |

(Continued)

OTHER PUBLICATIONS

Extended European Search Report issued in EP 22194027.3-1001 by the European Patent Office on Aug. 24, 2023.

(Continued)

*Primary Examiner* — Renan Luque
(74) *Attorney, Agent, or Firm* — Studebaker Brackett PLLC (57) ABSTRACT

A measurement device is provided. Said measurement device comprises a plurality of ports for receiving and/or transmitting radio frequency signals, a plurality of measurement units with one measurement unit for each of the plurality of ports, each measurement unit being configured to measure the corresponding forward and/or reverse radio frequency signal, and a subset of additional measurement units, preferably one additional measurement unit, configured to be connected to a subset, preferably one, of the ports in addition to or instead of the respective at least one of the plurality of measurement units.

15 Claims, 3 Drawing Sheets

(51) Int. Cl.
*H04B 1/00* (2006.01)
*H04B 17/10* (2015.01)
*H04B 17/20* (2015.01)
*H04W 24/10* (2009.01)

(52) U.S. Cl.
CPC ......... *H04B 17/101* (2015.01); *H04B 17/201* (2023.05); *H04W 24/10* (2013.01)

(58) Field of Classification Search
CPC ...... H03M 1/001; H04W 24/10; G01R 15/08; G01R 27/06; G01R 27/32; G01R 31/00; G01R 23/16; H04L 41/14
See application file for complete search history.

(56) References Cited

U.S. PATENT DOCUMENTS

| | | | |
|---|---|---|---|
| 2009/0098847 | A1 | 4/2009 | Noujeim |
| 2015/0198639 | A1* | 7/2015 | Howald ............... G01R 21/133 |
| | | | 702/61 |
| 2023/0019522 | A1* | 1/2023 | Magers ................. G01R 27/06 |

FOREIGN PATENT DOCUMENTS

| | | |
|---|---|---|
| CN | 212463221 U | 2/2021 |
| CN | 113138297 A | 7/2021 |
| JP | 2020-191596 A | 11/2020 |
| KR | 10-2017-0057517 A | 5/2017 |

OTHER PUBLICATIONS

Hiebel, Michael et al.; Millimeter-Wave Measurements Using Converters of the R&S ZVA Family, Application Note 1EZ55, Rohde & Schwarz; Oct. 8, 2007, pp. 1-20.
Lin, Yen-Chung et al.; Multiport Scattering Matrix Determination From One-Port Measurements; IEEE Transactions on Microwave Theory and Techniques; vol. 63, No. 7; Jul. 1, 2015; pp. 2343-2352.

* cited by examiner

MEASUREMENT DEVICE AND METHOD FOR OPERATING A MEASUREMENT DEVICE

The invention relates to a measurement device, especially a high-frequency measurement device without dedicated external receiver, and a method for operating a measurement device, especially a high-frequency measurement device without dedicated external receiver.

Generally, in times of an increasing number of applications providing high-frequency capabilities, there is a growing need of a measurement device and a corresponding operating method for performing measurements with respect to such applications in order to verify their correct functioning with special respect to eminently high frequencies in a particular cost-efficient manner.

JP 2020-191596 A relates to a high-frequency switch that switches high-power high-frequency signals, and a signal generator and spectrum analyzer equipped with the same.

Furthermore, CN 109324248 A discloses an integrated vector network analyzer for data domain analysis and a test method of the integrated vector network analyzer in the context of high-speed data transmission testing.

Moreover, U.S. Pat. No. 9,557,358 B2 presents a test and measurement instrument and associated methods for acquiring and stitching wide overlapped non-uniform frequency bands so that a user specified band can be displayed and analyzed.

In addition, CN 212463221 U relates to a vector network analyzer and a spread spectrum module thereof. In this context, when the frequency band of the system is switched, a radio frequency switch in the spread spectrum module switches the corresponding frequency channel. Disadvantageously, said spread spectrum module is not only an additional device, which has to be employed in addition to the vector network analyzer, but also has a complex design, thereby increasing efforts and costs.

Accordingly, there is the object to provide a measurement device and a method for operating a measurement device in order to allow for performing measurements, especially measurements in the context of eminently high frequencies, thereby ensuring a particularly high cost-efficiency and less efforts.

This object is solved by the features of claim 1 for a measurement device and the features of claim 15 for a method for operating a measurement device. The dependent claims contain further developments.

According to a first aspect of the invention, a measurement device is provided. Said measurement device comprises a plurality of ports for receiving and/or transmitting radio frequency signals, a plurality of measurement units with one measurement unit for each of the plurality of ports, each measurement unit being configured to measure the corresponding forward and/or reverse radio frequency signal, and a subset of additional measurement units, preferably one additional measurement unit, configured to be connected to a subset, preferably one, of the ports instead of the respective at least one of the plurality of measurement units. Advantageously, the corresponding frequency range can be extended in a particularly efficient manner, thereby saving costs and efforts.

With respect to the plurality of ports, it is noted that the measurement device may especially comprise between two and six ports, preferably four ports.

With respect to measuring with the aid of the measurement units, it might be particularly advantageous if amplitude and phase are measured for the respective forward signal and the respective backward signal, preferably if the corresponding S-parameters are measured.

With respect to connecting the subset, preferably a single one, of the ports to the subset of additional measurement units, preferably the additional measurement unit, it is noted that in case a higher frequency should be measured, the respective measurement unit or units, respectively, typically connected to the corresponding port or ports, respectively, can be disconnected from that port or ports, respectively, and the additional measurement unit or units, respectively, can be connected to that port or ports, respectively, instead. In this context, it might be particularly advantageous if there is a single additional measurement unit. As such, only one port should allow this.

It should be emphasized that it might be particularly advantageous if there is exactly only one additional measurement unit that can especially be connected to exactly only one of the ports.

According to a first preferred implementation form of the first aspect of the invention, the measurement device comprises or is a network analyzer, especially a vector network analyzer, a radio communication tester, especially a non-signaling radio communication tester, a vector signal transceiver, a multi-port spectrum and signal analyzer. In addition to this or as an alternative, the subset of additional measurement units, preferably the additional measurement unit, is frequency-selective. Further additionally or further alternatively, the subset of additional measurement units, preferably the additional measurement unit, is operated in parallel to the respective at least one of the plurality of measurement units. Advantageously, for instance, a particularly high flexibility can be ensured, which also reduces costs and efforts.

With respect to said frequency-selectiveness, it is noted that it might be particularly advantageous if frequency can be chosen by the user.

According to a second preferred implementation form of the first aspect of the invention, the subset of additional measurement units, preferably the additional measurement unit, is configured to be operated in a frequency range different than the plurality of the measurement units. In this context, said frequency range is preferably higher than the frequency range of the measurement units. Advantageously, for example, the corresponding harmonics of higher orders can be measured in a very cost-efficient manner.

"Different" is to be understood that at least the upper end of the frequency range is different. However, in addition also the lower end of the frequency range may be different. The frequency ranges may be overlapping or non-overlapping.

It is noted that it might be particularly advantageous if said frequency range is 1.5 times or two times or three times higher than the frequency range of the measurement units.

It is further noted that it might be particularly advantageous if the frequency range comprises or is an upper frequency limit.

According to a further preferred implementation form of the first aspect of the invention, the subset of additional measurement units, preferably the additional measurement unit, is arranged directly at the subset of respective ports, preferably at the respective port. Advantageously, for instance, the length of the corresponding conductor can be very short, thereby ensuring an accurate measurement.

With respect to said direct arrangement at the respective port, it is noted that only minimum of the corresponding line structure may advantageously be shared by the additional measurement unit or units, respectively, and the respective measurement unit or units, respectively, assigned to that port or ports, respectively.

In this context, it might be particularly advantageous if the subset of additional measurement units, preferably the additional measurement unit, is arranged directly at the entrance of the respective port or ports, respectively.

According to a further preferred implementation form of the first aspect of the invention, the subset of additional measurement units, preferably the additional measurement unit, is configured to be operated exclusively as subset of receivers, preferably as receiver. Advantageously, for example, complexity can be reduced, which further increases cost-efficiency.

In this context, it might be particularly advantageous if the additional measurement units or unit, respectively, cannot generate and transmit signals.

According to a further preferred implementation form of the first aspect of the invention, the subset of additional measurement units, preferably the additional measurement unit, is integrated in the measurement device. Advantageously, for instance, the usage of external hardware can be avoided, which saves space, and thus also costs.

In this context, it might be particularly advantageous if the additional measurement units or unit, respectively, are not visible from the outside of the measurement device.

According to a further preferred implementation form of the first aspect of the invention, the measurement device further comprises a signal routing unit comprising a common connector connected to a subset, preferably one, of the plurality of ports of the measurement device, a first connector connected to a subset, preferably one, of the plurality of measurement units, and a second connector connected to the subset of additional measurement units, preferably the additional measurement unit. In this context, the signal routing unit is configured to forward the respective signal or signals from the common connector to the first connector and/or the second connector. Advantageously, for example, signal forwarding can be achieved at low costs and less effort.

With respect to the signal routing unit, it is noted that it might be particularly advantageous if said signal routing unit comprises or is a coupler, a switch, a relay, a solid state switch, or any combination thereof.

According to a further preferred implementation form of the first aspect of the invention, the signal routing unit comprises or is a switching unit, preferably a switch. Additionally or alternatively, the signal routing unit is configured to connect the common connector to the first connector in a first switching state. In addition to this or as an alternative, the signal routing unit is configured to connect the common connector to the second connector in a second switching state. Advantageously, for instance, simplicity, and thus cost-efficiency, can further be increased.

According to a further preferred implementation form of the first aspect of the invention, the signal routing unit comprises or is a coupler comprising a through path connecting the common connector with the first connector, and a couple path connecting the common connector with the second connector. Advantageously, for example, the corresponding attenuation of said different paths can be adapted in accordance with the respective application, thereby ensuring a high accuracy of measurement.

With respect to the through path, it is noted that said through path may especially be the path with the least amount of attenuation.

With respect to the couple path, it is noted that said couple path may especially be the path with a higher attenuation.

According to a further preferred implementation form of the first aspect of the invention, the subset of additional measurement units, preferably the additional measurement unit, comprises at least one, especially each, of a mixer, a local oscillator, an analog-to-digital converter, a filter. Advantageously, for instance, complexity can further be reduced, which leads to an increased cost efficiency.

According to a further preferred implementation form of the first aspect of the invention, the analog-to-digital converter is a separate analog-to-digital converter or the analog-to-digital converter of the corresponding measurement unit connected to the respective port. Advantageously, for example, component requirement can further be decreased, thereby reducing costs and efforts.

According to a further preferred implementation form of the first aspect of the invention, the measurement device further comprises a storage unit comprising calibration data for the path from the respective port to the subset of additional measurement units, preferably the additional measurement unit. Advantageously, for instance, calibration can be performed in a very simple, and thus cost-efficient, manner.

In this context, it is noted that it might be particularly advantageous if calibration for the additional measurement units or unit, respectively, is done by using signal generated by at least one of the other ports fed into the respective ports which are connected to the additional measurement units or unit, respectively.

According to a further preferred implementation form of the first aspect of the invention, the measurement device is configured to output the corresponding signal strength measured by the subset of additional measurement units, preferably the additional measurement unit. Advantageously, for example, the signal strength with special respect to signals of eminently high frequency can be measured in a particularly cost-efficient manner.

According to a further preferred implementation form of the first aspect of the invention, the measurement device is configured to receive a target measurement frequency or a target measurement frequency range for adjusting the subset of additional measurement units, preferably the additional measurement unit.

Advantageously, the frequency the additional measurement unit is operated can be input in a direct or remote manner. In that case, it is noted that the corresponding local oscillator may especially be adjusted. Further advantageously, a sweep could take place so that the respective spectrum is recorded over a certain frequency range.

According to a second aspect of the invention, a method for operating a measurement device is provided. Said method comprises the steps of receiving and/or transmitting radio frequency signals with the aid of a plurality of ports of the measurement device, measuring the corresponding forward and/or reverse radio frequency signal with the aid of a plurality of measurement units of the measurement device with one measurement unit for each of the plurality of ports, and connecting a subset of additional measurement units, preferably one additional measurement unit, of the measurement device to a subset, preferably one, of the ports instead of the respective at least one of the plurality of measurement units.

Exemplary embodiments of the invention are now further explained with respect to the drawings by way of example only, and not for limitation. In the drawings.

Figure 1A:
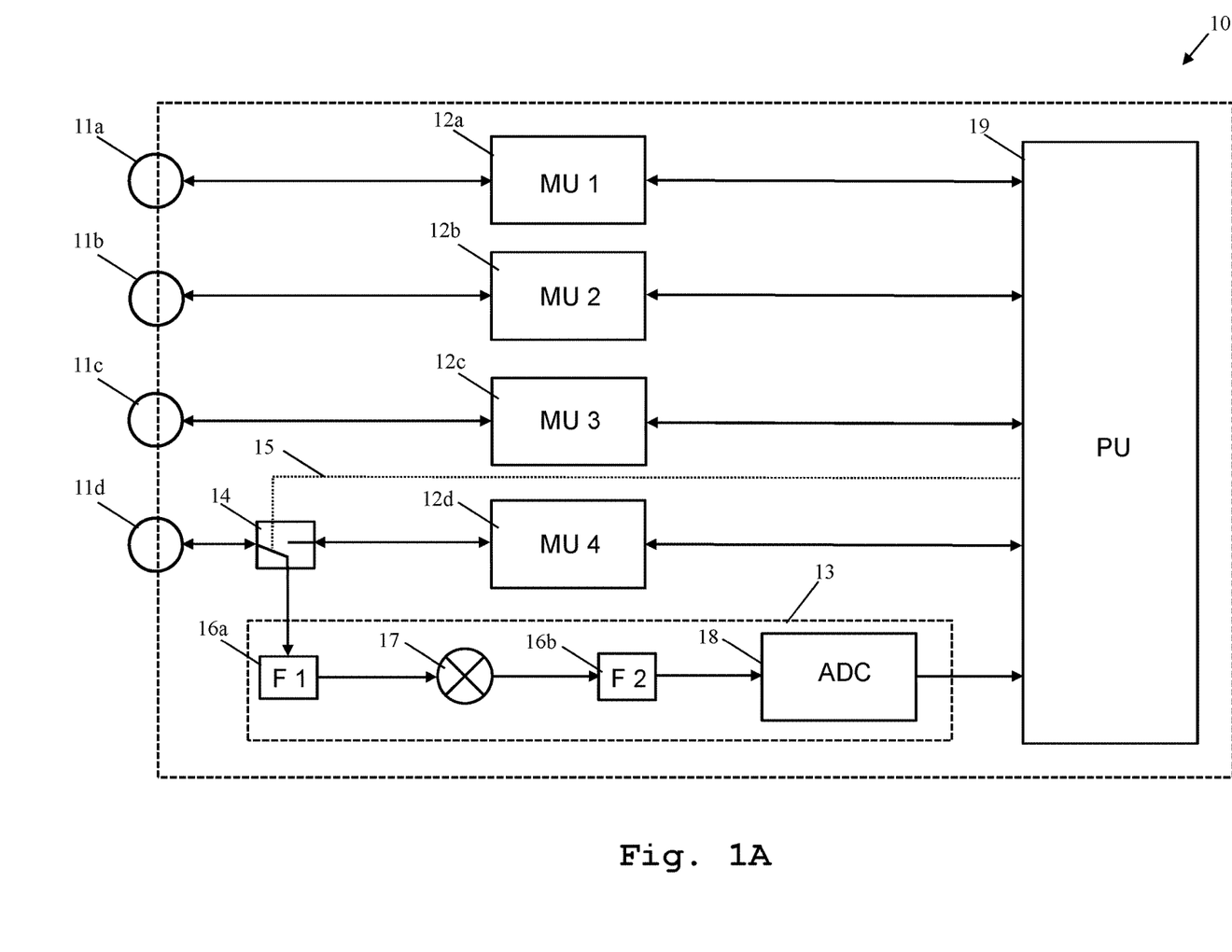
FIG. 1A shows an exemplary embodiment of an inventive measurement device.

With respect to FIG. 1A, a block diagram of an exemplary embodiment of an inventive measurement device 10 is shown.

According to FIG. 1A, said measurement device 10 comprises four ports 11a, 11b, 11c, 11d for receiving and/or transmitting radio frequency signals, four measurement units 12a, 12b, 12c, 12d with one measurement unit for each of the four ports 11a, 11b, 11c, 11d, each measurement unit being configured to measure the corresponding forward and/or reverse radio frequency signal, and one additional measurement unit 13 configured to be connected to one of the ports 11a, 11b, 11c, 11d, exemplarily port 11d, instead of the respective one of the four measurement units 12a, 12b, 12c, 12d, exemplarily measurement unit 12d.

It is noted that it might be particularly advantageous if the measurement device 10 comprises or is a network analyzer, especially a vector network analyzer, a radio communication tester, especially a non-signaling radio communication tester, a vector signal transceiver, a multiport spectrum and signal analyzer.

In addition to this or as an alternative, the additional measurement unit 13 may advantageously be frequency-selective.

As it can further be seen from FIG. 1A, the measurement device 10 additionally comprises a signal routing unit 14, a control line 15, and a processing unit 19.

With respect to the additional measurement unit 13, which additionally comprises a first filter 16a, a mixer 17, a second filter 16b, and an analog-to-digital converter 18, it is noted that said additional measurement unit 13 may be configured to be operated in a frequency range different than the plurality of the measurement units, wherein said frequency range is preferably higher than the frequency range of the measurement units 12a, 12b, 12c, 12d.

"Higher" is to be understood that at least the upper end of the frequency range is different. However, in addition also the lower end of the frequency range may be different. The frequency ranges may be overlapping or non-overlapping.

With respect to said first filter 16a, it is noted that a first terminal, especially an input, of the first filter 16a is connected to a first terminal, especially an output, of the above-mentioned signal routing unit 14, whereas a second terminal, especially a combined input and output, of the signal routing unit 14 is connected to the port 11d and a third terminal, especially a combined input and output, of the signal routing unit 14 is connected to a first terminal, especially a combined input and output, of the measurement unit 12d.

Again, with respect to the first filter 16a, it is further noted that a second terminal, especially an output, of the first filter 16a is connected to a first terminal, especially an input, of the mixer 17, whereas a second terminal, especially an output, of said mixer 17 is connected to a first terminal, especially an input, of the above-mentioned second filter 16b. In addition to this, a second terminal, especially an output, of said second filter 16b is connected to a first terminal, especially an input, of the above-mentioned analog-to-digital converter 18, whereas a second terminal, especially an output, of said analog-to-digital converter 18 is connected to a first terminal, especially an input, of the above-mentioned processing unit 19.

Moreover, the first port 11a is connected to a first terminal, especially a combined input and output, of the first measurement unit 12a, whereas a second terminal, especially a combined input and output, of said first measurement unit 12a is connected to a second terminal, especially a combined input and output, of the processing unit 19.

Analogously, the second port 11b is connected to a first terminal, especially a combined input and output, of the second measurement unit 12b, whereas a second terminal, especially a combined input and output, of said second measurement unit 12b is connected to a third terminal, especially a combined input and output, of the processing unit 19.

Further analogously, the third port 11c is connected to a first terminal, especially a combined input and output, of the third measurement unit 12c, whereas a second terminal, especially a combined input and output, of said third measurement unit 12c is connected to a fourth terminal, especially a combined input and output, of the processing unit 19.

With respect to the above-mentioned measurement unit 12d, which can be seen as the fourth measurement unit, it is noted that a second terminal, especially a combined input and output, of said fourth measurement unit 12d is connected to a fifth terminal, especially a combined input and output, of the processing unit 19.

As it can further be seen from FIG. 1A, a control line 15 connects a sixth terminal, especially a control terminal, of the processing unit 19 to a fourth terminal, especially a control terminal, of the above-mentioned signal routing unit 14.

With respect to the above-mentioned processing unit 19, it is noted that it might be particularly advantageous if said processing unit 19 is configured to process measurement data with respect to at least one, preferably each, of the measurement units 12a, 12b, 12c, 12d and/or the additional measurement unit 13.

In addition to this or as an alternative, it might be particularly advantageous if the processing unit 19 is configured to control the signal routing unit 14 especially such that in the case of measuring a frequency being greater than the corresponding range of the measurement units 12a, 12b, 12c, 12d, the respective signal being present at the fourth port 11d is passed to the additional measurement unit 13 instead of the fourth measurement unit 12d.

With respect to the additional measurement unit 13, it is noted that it might be particularly advantageous if said additional measurement unit 13 is arranged directly at the respective port, exemplarily the fourth port 11d.

Furthermore, the additional measurement unit 13 may preferably be configured to be operated exclusively as receiver. In accordance therewith, the first terminal of the signal routing unit 14 for connecting the additional measurement unit 13 exemplarily is an output.

Advantageously, as it can be seen from FIG. 1A, the additional measurement unit 13 is integrated in the measurement device 10.

With respect to the above-mentioned signal routing unit 14, it is noted that said signal routing unit 14 may preferably comprise a common connector exemplarily connected to the fourth port 11d, which has already been described above as the second terminal of the signal routing unit 14, a first connector exemplarily connected to the fourth measurement unit 12d, which has already been described above as the third terminal of the signal routing unit 14, and a second connector exemplarily connected to the additional measurement unit 13, which has already been described above as the first terminal of the signal routing unit 14.

In this context, it might be particularly advantageous if the signal routing unit 14 is configured to forward the respective signal or signals from the common connector to the first connector and/or the second connector especially on the basis of the signal being present at the fourth terminal of the signal routing unit 14.

Furthermore, the signal routing unit 14 may especially comprise or be a switching unit, preferably a switch.

In addition to this or as an alternative, the signal routing unit 14 may preferably be configured to connect the common connector to the first connector in a first switching state.

Further additionally or further alternatively, the signal routing unit 14 may preferably be configured to connect the common connector to the second connector in a second switching state.

It is noted that the signal routing unit 14 may especially comprise or be a coupler comprising a through path connecting the common connector with the first connector, and a couple path connecting the common connector with the second connector.

With respect to the additional measurement unit 13, it is noted that it might be particularly advantageous if said additional measurement unit 13 further comprises a local oscillator which is not explicitly be shown in FIG. 1A. In this context, the mixer 17 may preferably mix the signal being present at its first terminal with the signal being output by said local oscillator.

With respect to the analog-to-digital converter 18 of the additional measurement unit 13, it is noted that said analog-to-digital converter 18 can be a separate analog-to-digital converter as exemplarily shown or the not explicitly shown analog-to-digital converter of the corresponding measurement unit 12d connected to the respective port 11d.

Furthermore, it is noted that it might be particularly advantageous if the measurement device 10 further comprises a storage unit being not explicitly shown in FIG. 1A and comprising calibration data for the path from the respective port 11d to the additional measurement unit 13.

With respect to the measurement device 10, it might be particularly advantageous if the measurement device 10 is configured to output the corresponding signal strength measured by the additional measurement unit 13.

It is further noted that the measurement device 10 may preferably be configured to receive a target measurement frequency or a target measurement frequency range for adjusting the additional measurement unit 13.

Figure 1B:
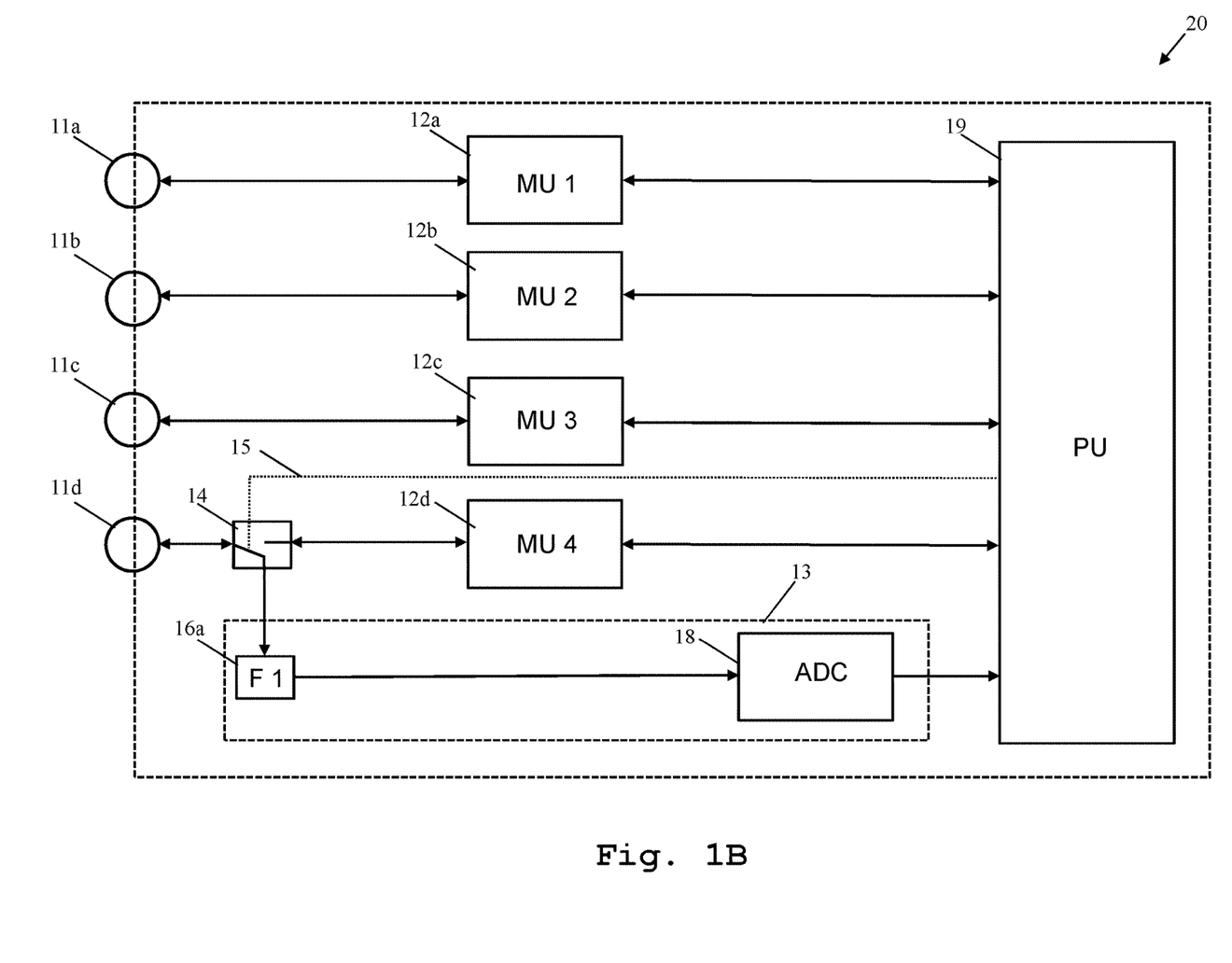
FIG. 1B shows a further exemplary embodiment of an inventive measurement device.

Now, with respect to FIG. 1B, a further exemplary embodiment 20 of an inventive measurement device is illustrated, which is based on the embodiment 10 as described above, wherein the above-mentioned mixer 17 and the second filter 16b have been omitted.

Advantageously, especially depending on the frequency range or the upper frequency limit, respectively, of the analog-to-digital converter 18, the second terminal, especially the output, of the filter 16a can directly be connected to the first terminal, especially the input, of the analog-to-digital converter 18.

Figure 2:
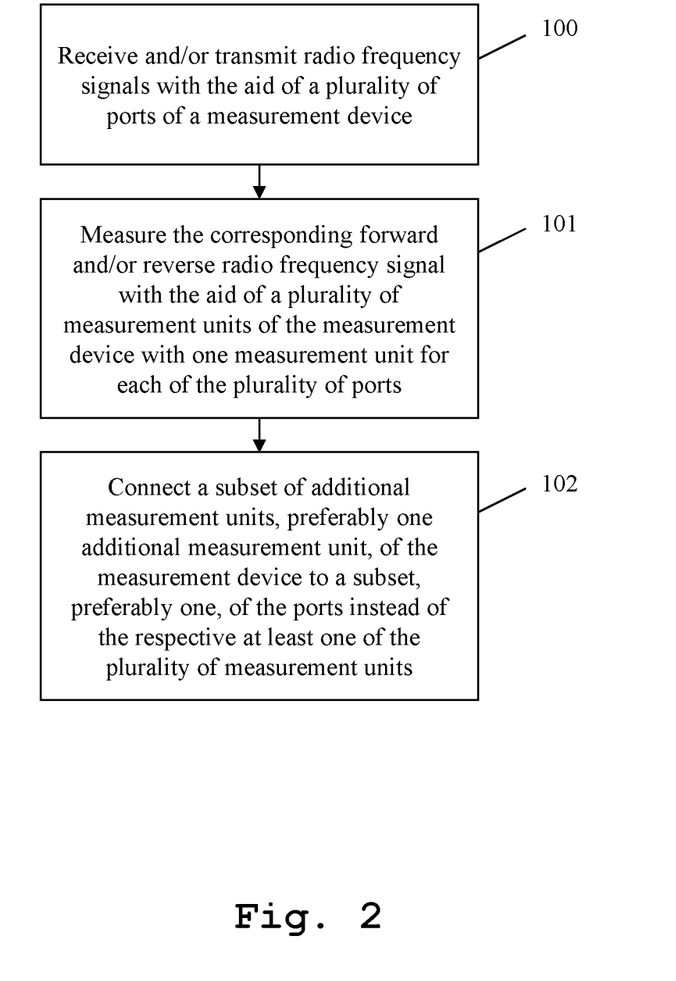
FIG. 2 shows a flow chart of an embodiment of the second aspect of the invention.

Finally, FIG. 2 shows a flow chart of an embodiment of the inventive method for operating a measurement device. In a first step 100, radio frequency signals are received and/or transmitted with the aid of a plurality of ports of the measurement device. Then, in a second step 101, the corresponding forward and/or reverse radio frequency signal is measured with the aid of a plurality of measurement units of the measurement device with one measurement unit for each of the plurality of ports. Furthermore, in a third step 102, a subset of additional measurement units, preferably one additional measurement unit, of the measurement device is connected to a subset, preferably one, of the ports instead of the respective at least one of the plurality of measurement units.

It is noted that the measurement device may comprise or be a network analyzer, especially a vector network analyzer, a radio communication tester, especially a non-signaling radio communication tester, a vector signal transceiver, a multi port spectrum and signal analyzer.

It is further noted that it might be particularly advantageous if the subset of additional measurement units, preferably the additional measurement unit, is frequency-selective.

Additionally or alternatively, the subset of additional measurement units, preferably the additional measurement unit, is operated in parallel to the respective at least one of the plurality of measurement units.

In other words, the method may comprise the step of operating the subset of additional measurement units, preferably the additional measurement unit, in parallel to the respective at least one of the plurality of measurement units.

Moreover, the subset of additional measurement units, preferably the additional measurement unit, may be configured to be operated in a frequency range different than the plurality of the measurement units. In this context, said frequency range may preferably be higher than the frequency range of the measurement units.

In other words, the method may further comprise the step of operating the subset of additional measurement units, preferably the additional measurement unit, in a frequency range different than the plurality of the measurement units, wherein said frequency range may preferably be higher than the frequency range of the measurement units.

It is further noted that the subset of additional measurement units, preferably the additional measurement unit, may be arranged directly at the respective subset of ports, preferably the respective port.

Furthermore, the subset of additional measurement units, preferably the additional measurement unit, may be configured to be operated exclusively as subset of receivers, preferably as receiver.

In other words, it might be particularly advantageous if the method further comprises the step of operating the subset of additional measurement units, preferably the additional measurement unit, exclusively as subset of receivers, preferably as receiver.

Moreover, it is noted that the subset of additional measurement units, preferably the additional measurement unit, may be integrated in the measurement device.

It is further noted that the measurement device may further comprise a signal routing unit comprising a common connector connected to a subset, preferably one, of the plurality of ports of the measurement device, a first connector connected to a subset, preferably one, of the plurality of measurement units, and a second connector connected to the subset of additional measurement units, preferably the additional measurement unit.

In this context, said signal routing unit may be configured to forward the respective signal or signals from the common connector to the first connector and/or the second connector.

In other words, the method may further comprise the step of forwarding the respective signal or signals from the common connector to the first connector and/or the second connector with the aid of the signal routing unit.

Furthermore, it might be particularly advantageous if the signal routing unit comprises or is a switching unit, preferably a switch.

In addition to this or as an alternative, the signal routing unit may configured to connect the common connector to the first connector in a first switching state.

In other words, the method may further comprise the step of connecting the common connector to the first connector in a first switching state with the aid of the signal routing unit.

Further additionally or further alternatively, the signal routing unit may be configured to connect the common connector to the second connector in a second switching state.

In other words, the method may further comprise the step of connecting the common connector to the second connector in a second switching state with the aid of the signal routing unit.

It is noted that the signal routing unit may comprise or be a coupler comprising a through path connecting the common connector with the first connector, and a couple path connecting the common connector with the second connector.

It is further noted that the subset of additional measurement units, preferably the additional measurement unit, may comprise at least one, especially each, of a mixer, a local oscillator, an analog-to-digital converter, a filter.

With respect to said analog-to-digital converter, it might be particularly advantageous if the analog-to-digital converter is a separate analog-to-digital converter or the analog-to-digital converter of the corresponding measurement unit connected to the respective port.

Moreover, the measurement device may further comprise a storage unit comprising calibration data for the path from the respective port to the subset of additional measurement units, preferably the additional measurement unit.

Furthermore, the measurement device may be configured to output the corresponding signal strength measured by the subset of additional measurement units, preferably the additional measurement unit.

In other words, the method may further comprise the step of outputting the corresponding signal strength measured by the subset of additional measurement units, preferably the additional measurement unit, with the aid of the measurement device.

It is noted that it might be particularly advantageous if the measurement device is configured to receive a target measurement frequency or a target measurement frequency range for adjusting the subset of additional measurement units, preferably the additional measurement unit.

In other words, the method may further comprise the step of receiving a target measurement frequency or a target measurement frequency range for adjusting the subset of additional measurement units, preferably the additional measurement unit, with the aid of the measurement device.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The invention claimed is:

1. A measurement device comprising:
   a plurality of ports for receiving and/or transmitting radio frequency signals,
   a plurality of measurement units with one measurement unit for each of the plurality of ports, each measurement unit being configured to measure the corresponding forward and/or reverse radio frequency signal, and
   a subset of additional measurement units configured to be connected to a subset of the ports in addition to or instead of the respective at least one of the plurality of measurement units,
   wherein the subset of additional measurement units is configured to be operated in a frequency range different than the plurality of the measurement units.

2. The measurement device according to claim 1,
   wherein the measurement device comprises or is a network analyzer, a radio communication tester, a vector signal transceiver, a multi port spectrum and signal analyzer, and/or
   wherein the subset of additional measurement units is frequency-selective, and/or
   wherein the subset of additional measurement units is operated in parallel to the respective at least one of the plurality of measurement units.

3. The measurement device according to claim 1,
   wherein said frequency range of said additional measurement unit is higher than the frequency range of the measurement units.

4. The measurement device according to claim 1,
   wherein the subset of additional measurement units is arranged directly at the respective subset of ports.

5. The measurement device according to claim 1,
   wherein the subset of additional measurement units is configured to be operated exclusively as subset of receivers.

6. The measurement device according to claim 1,
   wherein the subset of additional measurement units is integrated in the measurement device.

7. The measurement device according to claim 1, wherein the measurement device further comprises a signal routing unit comprising:
   a common connector connected to a subset of the plurality of ports of the measurement device,
   a first connector connected to a subset of the plurality of measurement units, and
   a second connector connected to the subset of additional measurement units,
   wherein the signal routing unit is configured to forward the respective signal or signals from the common connector to the first connector and/or the second connector.

8. The measurement device according to claim 7,
   wherein the signal routing unit comprises or is a switching unit, and/or
   wherein the signal routing unit is configured to connect the common connector to the first connector in a first switching state, and/or
   wherein the signal routing unit is configured to connect the common connector to the second connector in a second switching state.

9. The measurement device according to claim 7, wherein the signal routing unit comprises or is a coupler comprising:

a through path connecting the common connector with the first connector, and a couple path connecting the common connector with the second connector.

10. The measurement device according to claim 1, wherein the subset of additional measurement units comprises at least one of a mixer, a local oscillator, an analog-to-digital converter, a filter.

11. The measurement device according to claim 10, wherein the analog-to-digital converter is a separate analog-to-digital converter or the analog-to-digital converter of the corresponding measurement unit connected to the respective port.

12. The measurement device according to claim 1, wherein the measurement device further comprises a storage unit comprising calibration data for the path from the respective port to the subset of additional measurement units.

13. The measurement device according to claim 1, wherein the measurement device is configured to output the corresponding signal strength measured by the subset of additional measurement units.

14. The measurement device according to claim 1, wherein the measurement device is configured to receive a target measurement frequency or a target measurement frequency range for adjusting the subset of additional measurement units.

15. A method for operating a measurement device, the method comprising the steps of:

receiving and/or transmitting radio frequency signals with the aid of a plurality of ports of the measurement device, measuring the corresponding forward and/or reverse radio frequency signal with the aid of a plurality of measurement units of the measurement device with one measurement unit for each of the plurality of ports, and connecting a subset of additional measurement units of the measurement device to a subset of the ports in addition to or instead of the respective at least one of the plurality of measurement units, wherein the subset of additional measurement units is configured to be operated in a frequency range different than the plurality of the measurement units.

* * * * *